Patented Sept. 13, 1927.

1,642,370

UNITED STATES PATENT OFFICE.

JOHN D. JENKINS AND EUGENE F. BERGER, OF MILWAUKEE, WISCONSIN, ASSIGNORS TO PITTSBURGH PLATE GLASS COMPANY, A CORPORATION OF PENNSYLVANIA.

FUNGICIDE CONTAINING COPPER AND METHOD OF MAKING THE SAME.

No Drawing.    Application filed November 17, 1925.   Serial No. 69,702.

The invention relates to a copper containing fungicide, and the method of making it. The invention has for its objects the provision of an improved fungicide, which, when added to water gives a colloidal relatively stable suspension of cuprous oxide or hydroxide, and the provision of a practical method for producing the fungicide at a cost low enough to render it available for commercial use.

Briefly stated, the product comprises a colloidal dispersion of cuprous oxide or hydroxide (and in some cases some metallic copper) in the presence of organic material. The organic material permits the copper compound to be prepared in a dry form, which may be applied to vegetation requiring treatment as a dust, or it may be mixed with water and applied as a spray. It is also possible to prepare the material in the form of a paste or liquid which may be mixed with water and used as a spray.

In a broad way the method of making involves the heating of an oxide or hydroxide of copper or a basic salt of copper in the presence of water and organic material containing substances capable of reducing the copper compound to cuprous oxide or hydroxide, and in some cases producing a certain amount of finely divided metallic copper. This mixture is then dried and ground, or as above pointed out, it may be prepared in the form of a paste or liquid.

The preferred procedure more specifically stated is as follows: A paste of copper hydroxide or basic copper sulfate is prepared by adding 1 part of sodium hydroxide dissolved in 10 parts of water to 4 parts of copper sulfate crystals dissolved in 8 parts of water, and filtering off the precipitate. This paste is then mixed with a compound consisting of about 70 per cent of gum arabic and 30 per cent of corn syrup, in the proportions of 1 part of copper to 6 parts of the mixture of gum arabic and corn syrup. The mixture is thoroughly stirred, giving a heavy viscous paste, which is spread out in pans and dried at a temperature of from 160° to 170° F. The dry cake is ground, and is then ready for use.

The product as thus prepared is a yellowish to dark brown color, containing ordinarily from 13 to 15 per cent by weight of copper, which product readily dissolves in water, giving a dense brown to yellow suspension consisting largely of cuprous oxide or hydroxide in a very fine state of subdivision. In some cases, such suspension also includes a certain proportion of metallic copper varying somewhat with the reducing agent and conditions of the reaction. The above procedure may be varied to produce a paste or liquid product by proceeding as follows: The paste of copper hydroxide, gum arabic and corn syrup is run into a tub or kettle and heated, with agitation, to about 100° C. until the copper hydroxide is largely or completely reduced to cuprous oxide or hydroxide. The paste or liquid thus produced may be mixed with water and used as a spray.

It is also possible to use other soluble organic compounds containing gums and reducible sugars, or other substances capable of reducing copper hydroxide; and the resultant compound may also be produced by methods which are widely divergent from the preferred one heretofore set forth, the invention involving the product not being limited with respect to the method of producing it, and not being limited to the use of the mixture of gum arabic and corn syrup as the soluble organic compound. For instance, a similar product may be produced by the precipitation of cuprous oxide from cuprous chloride by caustic soda, in the presence of organic material and drying the product so produced. The process is regarded as covering broadly the employment of a reducing compound (preferably an organic one, but not necessarily so), whose action upon copper hydroxide or basic salt of copper produces a compound of copper consisting of a mixture of cuprous hydroxide and cuprous oxide with or without the formation of some metallic copper and, at the same time, combining in this product, a soluble organic compound functioning as a protective colloid, which causes the copper compound to be in a state of sub-division such that, when the material is dissolved in water, the copper compound assumes a colloidal condition and remains in relatively stable suspension. The term oxide in the claims is used in the generic sense to comprehend hydroxides.

What we claim is:

1. A fungicide material in solid form, comprising a cuprous compound mixed with a soluble organic compound, and in a state of sub-division such that when the material is dissolved in water the cuprous compound remains in relatively stable suspension.

2. A fungicide material in solid form, comprising a cuprous compound and some metallic copper mixed with a soluble organic compound and in a state of sub-division such that when the material is dissolved in water, the cuprous compound and the metallic copper remains in a relatively stable suspension.

3. A fungicide, comprising a colloidal dispersion of a cuprous oxide in the presence of soluble organic material.

4. A fungicide, comprising a colloidal dispersion of a cuprous oxide and metallic copper in the presence of soluble organic material.

5. A process of making a copper containing fungicide, which consists in mixing a copper compound with a mixture of gum arabic and corn syrup, and heating the mixture so that the copper compound is reduced by said mixture to cuprous oxide or hydroxide.

6. A process of making a copper containing fungicide, which consists in mixing a paste made from sodium hydroxide dissolved in water and copper sulfate with an organic compound including reducing sugars and a gum and capable of reducing the copper compound to a cuprous oxide or hydroxide.

7. A process of making a copper containing fungicide, which consists in mixing a copper compound with an organic compound and a material capable of reducing the copper compound to cuprous oxide or hydroxide or metallic copper and drying the mixture.

8. A process of making a copper containing fungicide, which consists in mixing a copper protective colloid compound with an organic compound and a material capable of reducing the copper compound to cuprous oxide or hydroxide or metallic copper.

9. A fungicide composition comprising a copper compound, a reducing agent, and a protective colloid.

10. A fungicide composition comprising a copper compound, an organic reducing agent and a protecting colloid.

11. A fungicide composition comprising an inorganic copper compound, an organic reducing agent and a protective colloid.

12. A fungicide compound comprising a copper compound, a reducing sugar and a protective colloid.

13. The process of preparing a colloidal copper fungicidal suspension comprising treating a copper compound with a reducing agent and a protective colloid.

14. The process of producing a copper fungicide comprising mixing a copper compound with a reducing agent adapted to induce the formation of cuprous oxide, adding a protective colloid and drying the mixture.

JOHN D. JENKINS.
EUGENE F. BERGER.